ated Jan. 18,

(12) United States Patent
Kami

(10) Patent No.: US 9,116,916 B2
(45) Date of Patent: Aug. 25, 2015

(54) INFORMATION ORGANIZING SYTEM AND INFORMATION ORGANIZING METHOD

(75) Inventor: Nobuharu Kami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 190 days.

(21) Appl. No.: 13/577,409

(22) PCT Filed: Jan. 18, 2011

(86) PCT No.: PCT/JP2011/000210
§ 371 (c)(1),
(2), (4) Date: Aug. 6, 2012

(87) PCT Pub. No.: WO2011/102076
PCT Pub. Date: Aug. 25, 2011

(65) Prior Publication Data
US 2012/0310938 A1 Dec. 6, 2012

(30) Foreign Application Priority Data
Feb. 16, 2010 (JP) .................. 2010-031533

(51) Int. Cl.
*G06F 17/30* (2006.01)
(52) U.S. Cl.
CPC .... *G06F 17/30241* (2013.01); *G06F 17/30699* (2013.01)
(58) Field of Classification Search
CPC .............................................. G06F 17/30699
USPC ....................................................... 707/737
See application file for complete search history.

(56) References Cited

U.S. PATENT DOCUMENTS

| 2001/0029183 | A1 | 10/2001 | Ito |
| 2008/0001811 | A1* | 1/2008 | Kwon ........................... 342/352 |
| 2008/0208847 | A1* | 8/2008 | Moerchen et al. ................ 707/5 |

(Continued)

FOREIGN PATENT DOCUMENTS

| JP | 2001-290727 A | 10/2001 |
| JP | 2002-245061 A | 8/2002 |

(Continued)

OTHER PUBLICATIONS

International Search Report in PCT/JP2011/000210 dated Jan. 18, 2011 (English Translation Thereof).

(Continued)

*Primary Examiner* — James Trujillo
*Assistant Examiner* — Grace Park
(74) *Attorney, Agent, or Firm* — McGinn IP Law Group, PLLC

(57) ABSTRACT

An information organizing system includes a reference information database storing reference information, a generalized expression unit to map measurement data and non-measurement data in a space in such a manner that the more they resemble each other, the shorter a distance between them becomes, an extended reference database in which the reference information is expressed in an extended manner by using the generalized expression unit, extended log data in which log data is expressed in an extended manner by using the generalized expression unit, a relevance detection unit to detect extended reference information having high relevance with the extended log data, and a template creation unit to create a predetermined template in which the log data is summarized by using the detected extended reference information.

15 Claims, 11 Drawing Sheets

(56) References Cited

U.S. PATENT DOCUMENTS

| | | | |
|---|---|---|---|
| 2009/0048929 A1* | 2/2009 | Im | 705/14 |
| 2009/0100063 A1* | 4/2009 | Bengtsson et al. | 707/10 |
| 2010/0179754 A1* | 7/2010 | Faenger et al. | 701/208 |
| 2011/0035329 A1* | 2/2011 | Delli Santi et al. | 705/347 |

FOREIGN PATENT DOCUMENTS

| | | |
|---|---|---|
| JP | 2002-278993 A | 9/2002 |
| JP | 2003-242069 A | 8/2003 |
| JP | 2003-288354 A | 10/2003 |

OTHER PUBLICATIONS

Mayur Datar, et al., Locality-sensitive Hashing Scheme Based on p-Stable Distributions,(online), SCG '04 Proceedings of the Twentieth Annual Symposium on Computational Geometry, ACM, 2004, pp. 253-262, (retrieval date Feb. 4, 2011),<URL:http//portal.acm.org/ft_gatewway.cfm?id=997857&type=pdf>.

Tetsuo Ishibashi et al. "Approximate Hierarchical Clustering Algorithm Using Locality-Sensitive Hashing", IPSJ SIG Notes, Nov. 7, 2003, vol. 2003, No. 109, pp. 57 to 62, 2003-CVIM-141.

Japanese Office Action dated May 12, 2015 with English language Translation.

* cited by examiner

| FEATURE POINT | GEODETIC COORDINATES | CATEGORY INFORMATION | RATING INFORMATION |
|---|---|---|---|
| A | (a1, a2) | MOUNTAIN | 0.8 |
| B | (b1, b2) | THEME PARK | 0.7 |
| C | (c1, c2) | MOUNTAIN | 0.5 |
| D | (d1, d2) | MOUNTAIN | 0.9 |

Fig. 6

GGA-Global Positioning System Fix Data FORMAT
(OUTPUT EXAMPLE)
$GPGGA,053553,250.1508,N,12133.8346,E,1,03,01.7,00059.4,M,015.2,M,00,0000*4E

| | |
|---|---|
| 053553 | POSITION MEASUREMENT TIME (UTC) |
| 2502.1508,N | LATITUDE (NORTH LATITUDE) |
| 12133.8346,E | LONGITUDE (EAST LONGITUDE) |
| 1 | QUALITY OF GPS; 0=NOT RECEIVABLE, 1=SINGLE POSITION MEASUREMENT, 2=DGPS |
| 03 | NUMBER OF RECEIVED SATELLITES |
| 01.7 | HDOP |
| 00059.4,M | ANTENNA ALTITUDE FROM AVERAGE SEA LEVEL (M) |
| 015.2,M | ALTITUDE DIFFERENCE OF AVERAGE SEA LEVEL FROM WGS-84 ELLIPSOID (M) |
| 00 | AGE OF DGPS DATA (SECOND) |
| 0000 | ID OF DGPS BASE STATION |
| *4E | CHECKSUM |

Fig. 10

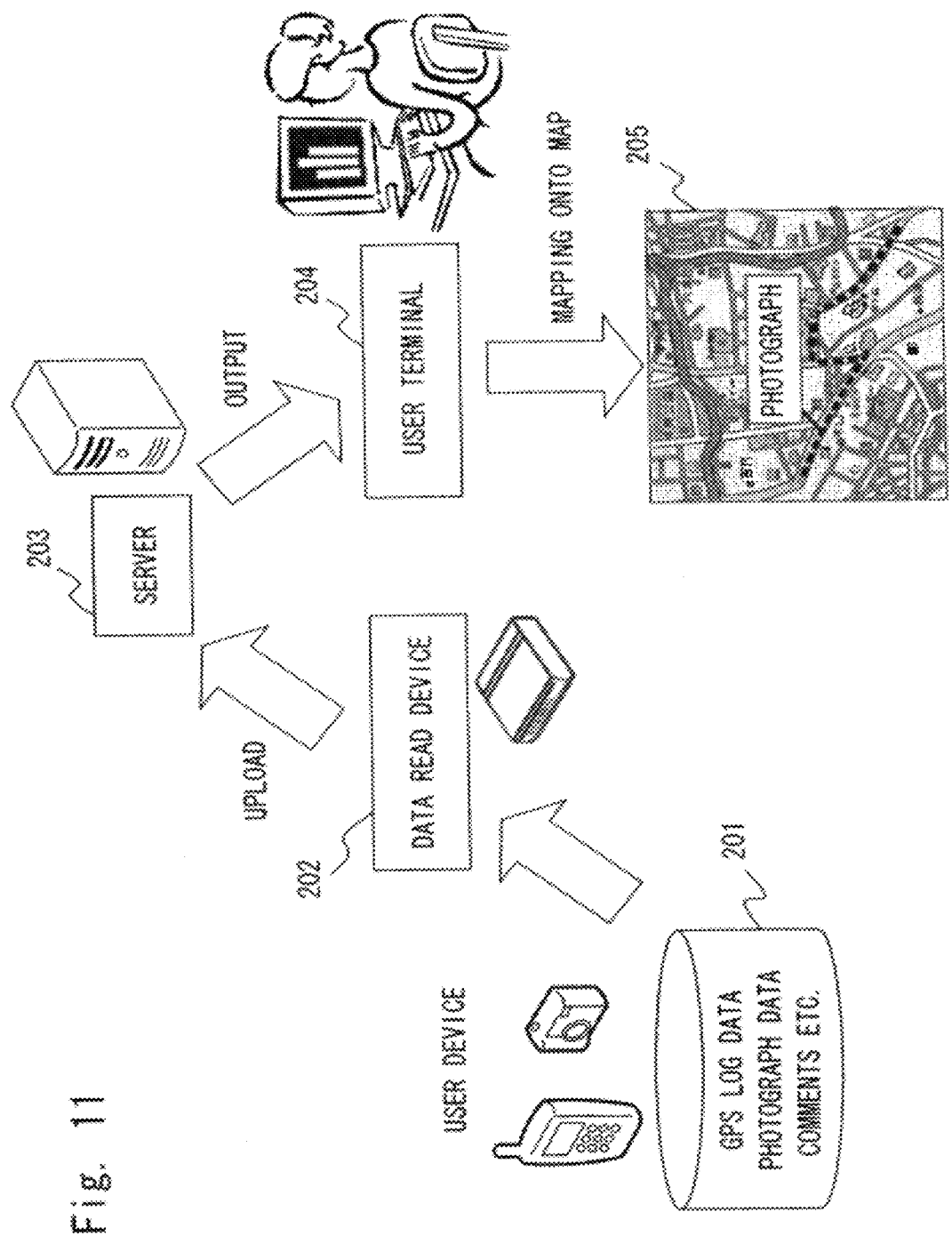

INFORMATION ORGANIZING SYTEM AND INFORMATION ORGANIZING METHOD

TECHNICAL FIELD

The present invention relates to an information organizing, system and an information organizing method for analyzing and organizing enormous information, in particular to an information organizing system and an information organizing method capable of efficiently extracting and displaying information important to a user.

BACKGROUND ART

As one of techniques for automatically analyzing and organ zing log data, there is a technique for displaying logs of a device that collects geodetic coordinate data such as a GPS logger, onto a route on map along which a user has actually traveled. FIG. 10 shows an example of a typical data format for OPS log data. By using GPS log data shown in FIG. 10, corresponding points on a map can be displayed based on data collected by a GPS logger at regular intervals, such as geodetic coordinates, as a group of points that are obtained by thinning out the corresponding points on the map at proper intervals with consideration given to the viewability, or a group of line segments connecting those points. Then, the user can use this route information, for example, when he/she records/creates a book of travel or the like.

Further, as a related art, there is a technique for associating photographs taken by a user with their shooting places and displaying those photographs on a map. In this case, a camera is equipped with a function equivalent to a GPS logger in order to associate photograph data with shooting places, so that geodetic coordinates can be added to the photograph data. Further, it is also possible to find a point in GPS log data that was recorded at a time closest to the shooting time of a photograph by using the shooting time information of the photograph and the GPS log data, and thereby to display the photograph on the assumption that the photograph was taken at that point.

FIG. 11 shows an information organizing system according to such related art. As shown in FIG. 11, the information organizing system according to the related art includes a user device 201, a data read device 202, a server 203, and a user terminal 204. GPS log data from a GPS logger, photograph data from a digital camera, or the like is uploaded from the user device 201 to the server 203 through the data read device 202. The server 203 automatically performs processes such as a process for associating data with map information, creates a corresponding file (e.g., html format), and outputs the created file to the user terminal 204. The user displays and checks the file 205 created by the server 203 by using the user terminal 204.

When the server 203 implements the function like this, the server 203 can use an API (Application Programming Interface) available from a third party that provides a map utility program. That is, it is possible to create an html file and/or a blog for the user by converting information into a format conforming to the API, supplying the converted information to the API, and then processing the obtained output information. In the information organizing system according to the above-described related art, the user can automatically create a blog or the like without carrying out complicated tasks such as analyzing GPS log data, editing corresponding map information, and mapping and displaying corresponding photograph data.

In general, when GPS log data itself or photograph data itself is displayed, the data amount becomes enormous. Therefore, it is necessary to select information and/or items necessary for the display. As a simple method, there is a method for automatically thinning out GPS log data by removing redundant part of the GPS log data, or a method in which it is determined whether all the taken photographs are displayed or the enormous data is compressed in accordance with a predetermined rule (for example, only a predetermined number of photographs are displayed). However, it is difficult to output information having high viewability like one that is obtained by summarizing the outline of the log data, by using these methods alone. For example, in the case of log data relating to a travel, it is desirable to create a template like a hook of ravel in which important traffic points and tourist spots are extracted and transfers between them are handled as transfer information. Further, for example, if famous spot data in which the user has an interest, among the nearby famous spots, is automatically displayed in that template even when they are not explicitly included in the log data, the information value of the template increases.

To achieve this purpose, in general, a database of famous spots that could become a distinctive feature is prepared. Further, information about user's interest is registered in advance. Then, to select relevance with the log data, relevance between N log data pieces (depending on circumstances, log data pieces obtained by properly thinning out the original log data pieces) and M famous spots registered in the famous-spot database is calculated. Further, this calculation for extracting relevance can be automated by carrying out the calculation in accordance with a predetermined rule or criterion in a manual fashion.

For example, physical distances from famous spots are extracted by using GPS log data. Then, famous spots that are located within a certain radius are selected as candidates. Further, they are compared with information about user's interest (e.g., category information such as genres in which the user has an interest) and they are further narrow down to famous spots that are determined to have high relevance. The determination of relevance can be made possible by performing a plurality of types of calculations including obtaining indices that are quantified by some method by N×M precise calculations, sorting the obtained indices, and narrowing down the sorted indices based on the information about user's interest.

Meanwhile, Patent literature 1 discloses a technique for dynamically reading user's interest based on log data without requiring the user to carry out complicated tasks such as the input/change of information relating to user's interest, and thereby distributing optimal information speedily and efficiently at the time of information distribution. In the information distribution system and information distribution method according to Patent literature 1, when a CM content recommend server receives predetermined information from a user terminal through a distribution management server, it identifies the user based on a user ID, detects information relating to user's interest while referring to a log data accumulation DB, and creates a distribution schedule so that a CM content suitable for the user is transmitted to the user terminal side based on the information relating to user's interest. Then, a streaming distribution server reads out the CM content based on the distribution schedule from a CM content accumulation DB and distributes the read CM content to the user terminal.

CITATION LIST

Patent Literature

Patent literature 1: Japanese Unexamined Patent Application Publication No. 2003-242069

SUMMARY OF INVENTION

Technical Problem

In the above-described information organizing system according to the related art, there is a problem that it is very difficult to select information that is considered to be important and characteristic to a user from enormous log data and to speedily and automatically display the summary information. This is because the superiority/inferiority of each content data piece is not included in the log data. Further, the user cannot determine the superiority/inferiority easily until the end of the log collection. Therefore, when the information amount is large, it is very difficult to input the superiority/inferiority information in a manual fashion. Further, as explained above in the related art section, when a database of a group of information pieces that could become a candidate as characteristic information is created in advance and information having high relevance is extracted with consideration given to the superiority/inferiority information that is different from one user to another, it is very difficult to display the information speedily because the calculation amount is large.

In view of the above-described problem to be solved, an object of the present invention is to provide an information organizing system and an information organizing method capable of selecting information that is considered to be important and characteristic to a user from enormous log data and speedily and automatically displaying the summary information.

Solution to Problem

An information organizing system according to the present invention includes: a reference information database that stores reference information: generalized expression means to map measurement data and non-measurement data in a space in such a manner that the more they resemble each other, the shorter a distance between them becomes; an extended reference information database that stores extended reference information that is generated by expressing the reference information in an extended manner by using the generalized expression means; extended log data that is generated by expressing log data in an extended manner by using the generalized expression means; relevance detection means to measure a strength of relevance between the extended reference information and the extended log data based on a distance in the mapped space, and detect extended reference information having high relevance with the extended log data; and template creation means to create a predetermined template in which the log data is summarized by using the extended reference information detected by the relevance detection means.

An information organizing method according to the present invention includes: registering log data; generating extended reference information by expressing reference information in an extended manner by using generalized expression means to map measurement data and non-measurement data in a space in such a manner that the more they resemble each other, the shorter a distance between them becomes; generating extended log data by expressing the log data in an extended manner by using the generalized expression means; measuring strength or relevance between the extended reference information and the extended log data based on a distance in the mapped space, and detecting extended reference information having high relevance with the extended log data; and creating a predetermined template in which the log data is summarized by using the detected extended reference information.

A program that causes a computer to execute a process for creating a predetermined template from a registered log data according to the present invention causes a computer to execute processes including: generating extended reference information by expressing reference information in an extended manner by using generalized expression means to map measurement data and non-measurement data in a space in such a manner that the more they resemble each other, the shorter a distance between them becomes; generating extended log data by expressing the log data in an extended manner by using the generalized expression means; measuring strength of relevance between the extended reference information and the extended log data based on a distance in the mapped space, and detecting extended reference information having high relevance with the extended log data; and creating a predetermined template in which the log data is summarized by using the detected extended reference information.

Advantageous Effects of Invention

According to the present invention, it is possible to provide an information organizing system and an information organizing method capable of selecting information that is considered to be important and characteristic to a user from enormous log data and speedily and automatically displaying summary information.

BRIEF DESCRIPTION OF DRAWINGS

FIG. 6 shows an example of characteristic information of an information organizing system according to an exemplary embodiment;

FIG. 10 shows an example of a typical data format for GPS log data; and

FIG. 11 is a diagram for explaining an information organizing system according to related art.

DESCRIPTION OF EMBODIMENTS

Figure 1:
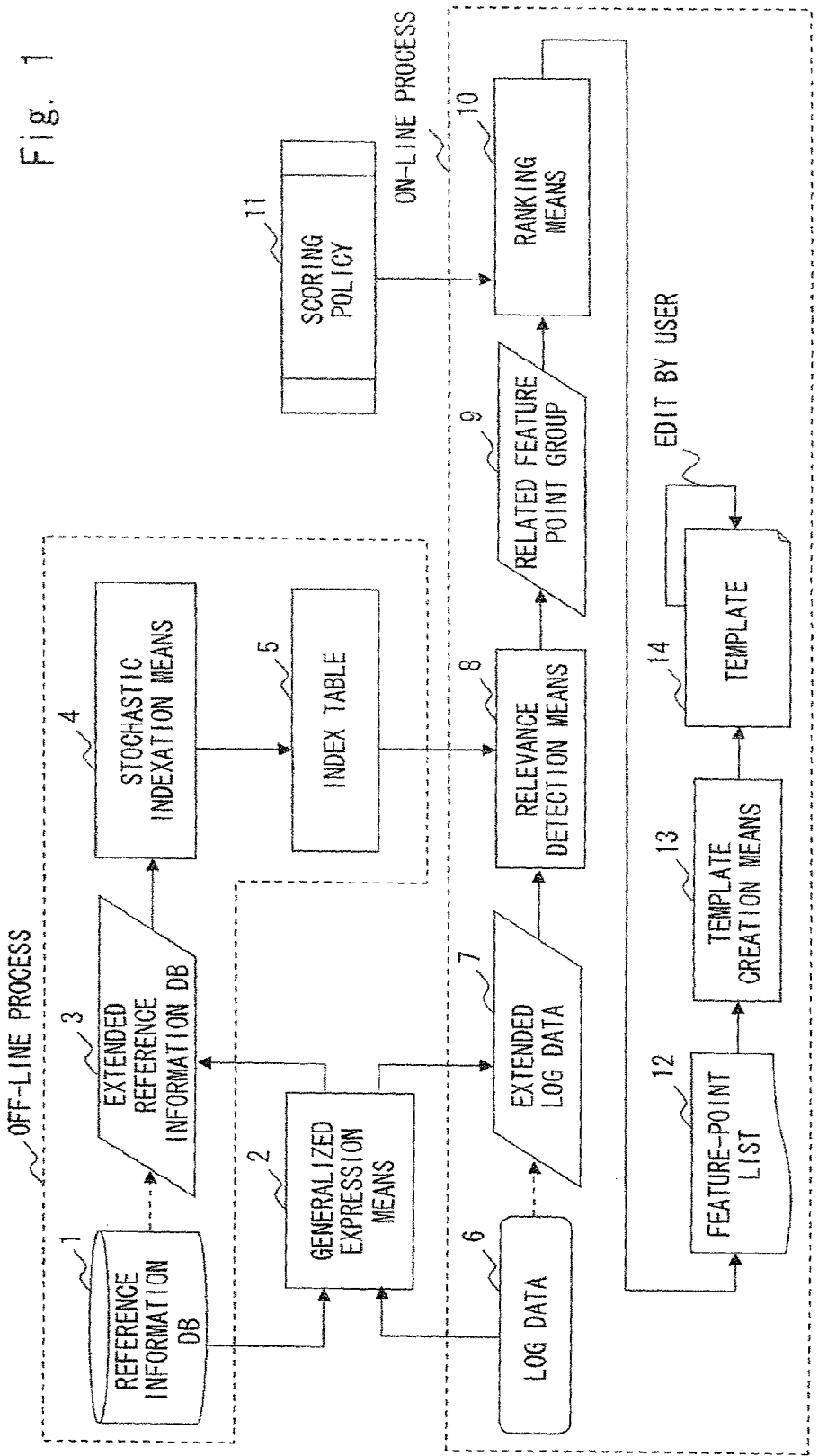
FIG. 1 is a block diagram showing an information organizing system according to an exemplary embodiment.

Exemplary embodiments according to the present invention are explained hereinafter with reference to the drawings. FIG. 1 is a block diagram showing an information organizing system according to this exemplary embodiment. As shown in FIG. 1, an information organizing system according to this exemplary embodiment includes a reference information database 1 that contains feature points and feature-point information relating to the feature points (hereinafter they are also called "reference information"), generalized expression means 2, an extended reference information database 3 that are expressed in a generalized manner by the generalized expression means 2, stochastic indexation means 4, and an index table 5 that is obtained by converting extended reference information into indices by using the stochastic indexation means 4. Further, the information organizing system also includes extended log data 7 that is obtained by expressing log data 6 uploaded from a user by using an upload device as a space in which distances are defined by using the generalized expression means 2 (typically, points in a vector space), and relevance detection means 8 to stochastically detect extended reference information having high relevance with the extended log data 7 among extended reference information registered in the index table 5. Note that reference information and extended reference information may be also expressed simply as "feature point" in the following explanation.

The information organizing system according to this exemplary embodiment also includes a related feature point group 9 that is a group of extended reference information pieces detected by the relevance detection means 8, a scoring policy 11 that is used to rank feature points (extended reference information), ranking means 10 to rank the above-described related feature point group 9 according to their superiority-inferiority/importance, a feature-point list 12 that is obtained by ranking feature points by the ranking means 10, and template creation means 13 to create a template 14 composed of the log data 6 and feature-point information having high relevance with them based on the feature-point list 12. Note that the template 14 is, for example, document information typified by html data such as a blog.

The reference information database 1 is a database of information that is commonly useful when a user creates summarized information such as a book of travel from log data, such as famous spots and important traffic points. The information accumulated by the reference information database 1 includes feature points and feature-point information (information containing information content as a feature) that is information relating to those feature points. Basic information relating to each feature point such as its name, geodetic coordinate information, and information about the type (category) of its famous spot, and detailed information (feature-point information) typified by the description of its feature and user's review comments are associated with each feature point. Note that the feature-point information includes measurement information that is directly measured and expressed in a measurement vector space (e.g., a three-dimensional space consisting of latitude, longitude, and altitude) such as geodetic coordinates, and non-measurement information describing a feature of a feature point (such as category information).

The generalized expression means 2 quantifies the measurement information (e.g., the geodetic coordinates) and the non-measurement information (e.g., category information) among the above-described feature-point information in such a manner that the mutual relation of their features are appropriately expressed, and expresses them as points in a multi-dimensional vector space. For example, the generalized expression means 2 expresses feature points in such a manner that feature points having mutually similar non-measurement features are disposed spatially-close to each other. In this case, the generalized vector space is expressed by the direct sum of the vector space used to express the above-described measurement information and the vector space used for the quantified expression of the non-measurement information, and its dimension is expressed as "(dimension of measurement vector space)+(dimension of vector space in which non-measurement information is quantified)". Examples of the method for quantifying non-measurement include a method using multidimensional scaling. However, the method for quantifying non-measurement is not necessarily limited to this method in this exemplary embodiment. That is, any method can be used provided that feature points having similar features are disposed at mutually-close points and a relation between feature points is reflected by their spatial position relation.

The extended reference information database 3 is a database containing detailed information of feature points each of which is obtained by quantifying a feature point registered in the reference information database 1 by the generalized expression means 2 and thereby re-expressing the feature point by a generalized expression. This is a database in which generalized expressions corresponding to feature points are registered for ID information (or names) of those feature points.

The stochastic indexation means 4 is means to convert feature points registered in the extended reference information database 3 into indices by stochastic neighborhood detection means that is designed in such a manner that the nearer feature points are located each other, with the higher probability they are assigned with entry IDs in the same index table. In this case, for example, approximate neighboring point search technique (LSH: Locality Sensitive Hashing) can be used. Although the following explanation is made by using the LSH as a typical example of the approximate neighboring point search technique, techniques other than the LSH can be also used provided that they can achieve a similar function to the LSH.

The LSH is a function of associating a point in a vector space with an ID (label) of an entry on a hash table and its method. The LSH is a technique that is designed in such a manner that the shorter the distance between two points is, with the higher probability they are hashed in the same entry. The LSD is applied to a neighborhood detection problem (problem to detect, when a query vector is given, a vector located near the query vector) and the like. For the details of its algorithm, for example, see Mayur Datar, Nicole Immorlica, Piotr Indyk, Vahab S. Mirrokni, Locality-sensitive hashing scheme based on p-stable distributions. Proceedings of the twentieth annual symposium on Computational geometry, pp. 253-262, 2004, Brooklyn, N.Y., USA.

The index table 5 is an information table in which a plurality of feature points are registered for entries having respective entry IDs, and is designed in such a manner that by designating an entry ID as a key, the pointer of feature-point information registered there and its detailed entity information can be referred. In the case where the above-described LSH is used, an entry ID (a pair of hash values) is a key, and it is possible to refer to feature-point information registered for that entry. When there are no restrictions on the calculation time, it may be designed in such a manner that points that are located close to each other in a generalized vector space are registered in the same entry based on precise distance calculation. As an example, there is a technique using Voronoi tessellation or the like.

The log data 6 is information that is obtained and uploaded to a sever by a user, typified by, for example, GPS geodetic coordinates obtained by a GPS logger, photograph data taken by a digital camera, and so on.

The extended log data 7 is data that is obtained by quantifying the log data 6 by the generalized expression means 2 and thereby expressed by a generalized expression as in the case of the above-described extended reference information database 3. In this process, in order to conform its dimension with the dimension of the vector space expressed by the generalized expression means for the feature points (extended reference information database 3), the dimension is extended based on information unique to the user (e.g., preference information such as category information in which the user has a strong interest). For example, when the feature point includes its category information in addition to the physical geodetic coordinates of the feature point, the dimension is extended by incorporating the category information in which the user has a strong interest into the GPS data so that the generalized expression of the log data 6 is disposed near the generalized expression of a feature point of which the interest is close. In contrast to this, if there is no category information in which the user has a strong interest, a method in which a predetermined initial value is set, for example, is used.

The relevance detection means 8 extracts extended feature point information having high relevance with the extended log data 7 among the extended feature point information registered in the index table 5 and outputs it as a relevance feature point group 9. For example, the relevance detection means 8 extracts closeness in spatial distance as a feature point having high relevance by using the LSH. Specifically, the extended log data 7 is input to the LSH and the output entry ID (a pair of hash values) is examined. Then, by using the entry ID as a key, feature point information registered in the index table 5 is extracted. As the characteristic of the index table 5, there is a high possibility that feature points that are close to each other in the generalized vector space, i.e., feature points having high relevance are registered in entries having the same table label. Therefore, feature points registered in entries having a table label of a certain data point of the extended log data 7 have high relevance with each other.

Further, there is a high possibility that a feature point having next high relevance is registered in its neighborhood (e.g., entry having a next table label). Therefore, it is possible to search for feature points having high relevance by searching neighboring table entries through a similar procedure until the necessary number of feature points is obtained. Note that in this exemplary embodiment, the relevance detection means 8 does not necessarily have to use the LSH. That is, any method can be used provided the method can extract extended feature points having high relevance with the extended log data 7 among the extended feature points registered in the index table 5 and output them as the related feature point group 9.

A series of feature point detection methods explained above does not extract feature points by using mere physical closeness between the log data 6 and the geodetic coordinates of the feature points, but does extract feature points with consideration given to information about user's interest. That is, closeness to a feature point including user context information such as information about user's interest is expressed as strength of relevance. Then, it is possible to extract a feature point in such a manner that the more the relevance is strong the closer in the generalized vector space), with the higher probability the feature point is extracted as information that is interest and valuable to the user. Note that the main reason for the use of the stochastic indexation means 4 using the LSH is to put importance on its speediness and thereby to reduce the calculation cost. Therefore, when there are no restrictions on the calculation cost, it is possible to use other neighboring point detection techniques such as neighborhood calculation based on precise calculation and Voronoi tessellation.

The scoring policy 11 is defined and provided for each user. In the scoring policy 11, information and rules that are used to determine superiority/importance for the importance of extracted feature points are described. The number of feature points to be extracted can be arbitrarily determined. However, if the number is too small, it is very difficult to extract feature points that sufficiently conform to the user's interest. On the other hand, if the number is too large, the calculation takes time. In addition, since information that is not very important is included, the effectiveness is lowered. Therefore, in this exemplary embodiment, it is desirable to extract the appropriate number of feature points according to the calculation cost and then to displaying them in the descending order of importance by carrying out scoring.

As the scoring policy 11, when there is an advance knowledge about feature point information on which importance is to be put (for example, importance is put on a feature point of which other user's rating is high and/or on a feature point belonging to a category in which the user had an interest in the past), a rule specifying that that feature point is rated in a high position based on this knowledge is described. Further, for example, when data collected by a user such as photograph data of a digital camera or the like is located near a feature point (not only the simple distance comparison in the generalized vector space, but also closeness in terms of, for example, GPS geodetic coordinates and shooting time), a rule specifying that that feature point is rated at a high position as an evidence indicating that the user has a stronger interest can be described. The above-described description example of the scoring policy 11 is a mere example, and the scoring policy 11 can be arbitrarily described based on the management policy of the administrator.

The ranking means 10 based on importance ranks the related feature point group 9 by using the above-described scoring policy 11 and outputs the ranked feature points group as a feature-point list 12. If necessary, it is also possible to set the upper-limit value for the number of feature points to be selected, such as selecting ten feature points from the highest position.

The template creation means 13 creates a template 14 in accordance with a format that is determined in advance based on the feature-point list 12. Note that examples of the template 14 include document information described in a markup language typified by, to example, "xml" and "html". This template 14 is constructed along a temporal shift of feature points that are extracted as a basic structure based on, for example, the log data of the user. Typical examples of the template 14 include a book of travel or the like in which characteristic famous spots through which the user has traveled from the start point to the end point, and connection information between these spots (transportation means, required time, and the like) are recorded based on GPS data input by the user.

The user can further edit this template 14. For this, it is possible to make the user's editing task easier by reconstructing the information of feature points that were considered to have high relevance and thereby extracted from the log data 6 but were not displayed because of the result of the ranking process based on the scoring policy 11, and data closely related to this feature point information by using this template 14.

Next, an operation of the information organizing system according to this exemplary embodiment is explained with reference to FIG. 2. Note that in the operation shown in FIG. 2, it is assumed that all reference information (information about feature points such as famous spots) is converted into indexes in advance by the above-described generalized expression means 2 through an off-line process and extended reference information is already registered in the index table 5. A user process on the client side and a processing process on the server side are carried out as shown below.

Figure 2:
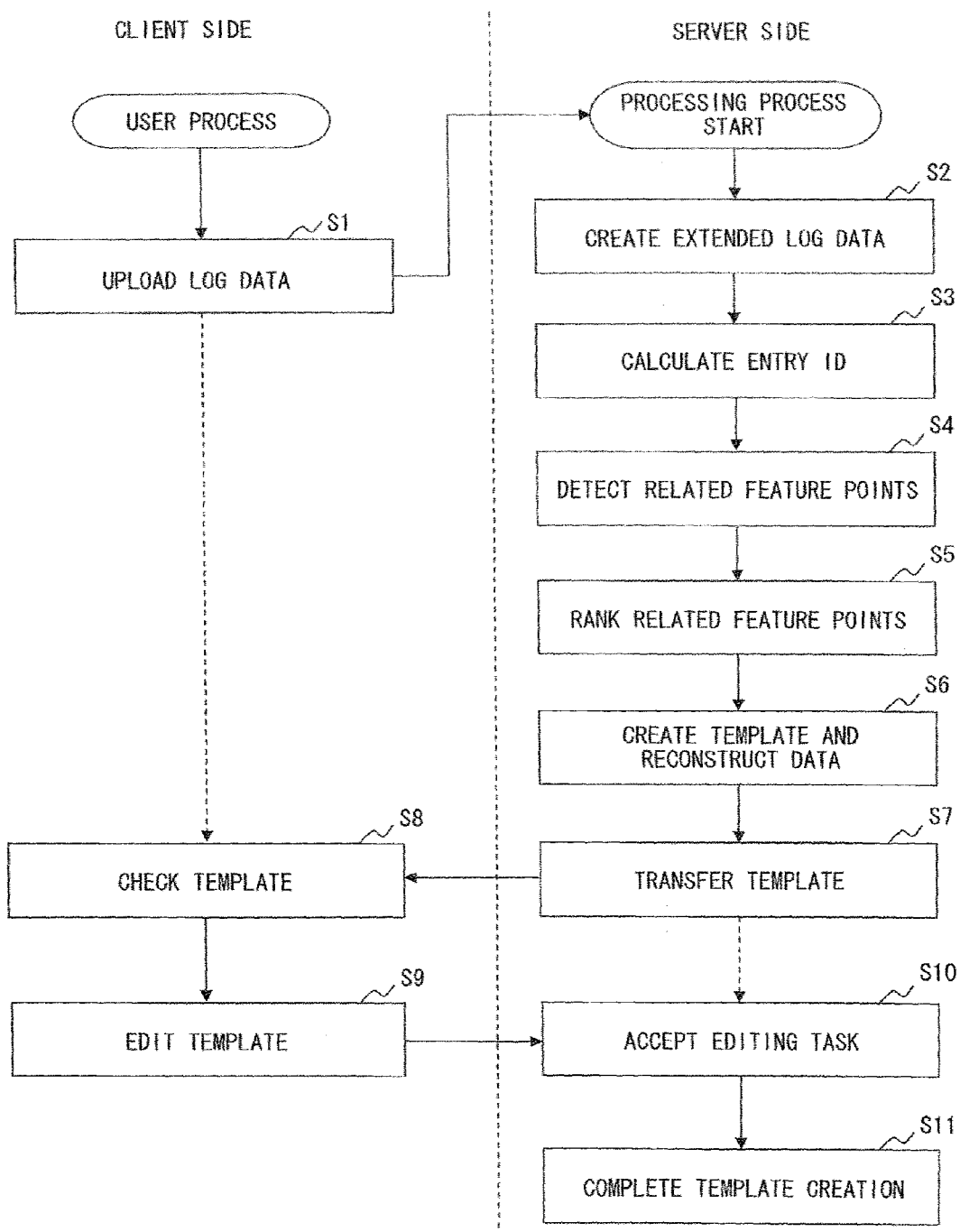
FIG. 2 is a flowchart for explaining an operation of an information organizing system according to an exemplary embodiment.

As shown in FIG. 2, a user logs in to the server system as he/she desires, and uploads log data of various devices typified by a GPS logger to the server by using a data read device or the like (step S1).

Next, on the server side, in response to the upload performed by the user, the uploaded log data is processed and thus its extended log data 7 expressed in a generalized manner is obtained by using the generalized expression means 2 (step S2). Note that the data processing is a series of data processing processes that are carried out according to a predetermined rule necessary for the subsequent process, such as thinning-out process of unnecessary GPS data, and dimension compression or expansion process to conform the dimension. Note that these processes are a mere example. That is, the data processing can be arbitrarily determined. Further, the extended log data 7 is described in a format that makes it possible to calculate an entry ID of the corresponding index table 5.

Next, an entry ID of the index table 5 onto which the extended log data 7 is mapped is calculated through the above-described stochastic indexation means (step S3).

Next, a feature point having high relevance with the extended data 7 is detected from the entry ID obtained in the step S3 by using the relevance detection means 8 (step S4). Typically, a feature point that is registered in a table entry having that entry ID is regarded as a feature point having the highest relevance. Then, a feature point having next highest relevance is extracted by searching neighboring table or carrying out a similar process as required, and by doing so, a predetermined number of feature points are extracted. The number of extracted feature points is usually determined according to a predetermined rule that depends on the indexation means, and is a number that is determined, for example, by defining the lower limit and the upper limit. Note that the rule that is used to determine the number of feature points to be extracted is not limited to the above-described rule and can be arbitrarily determined.

Next, the extracted feature point group is ranked in accordance with the scoring policy 11 (importance and/or priority) according to the user by using the ranking means 10 (step S5). The scoring policy 11 can be defined based on various rules including the importance of the feature points themselves such as important traffic points, preference information such as user's interests, and reputations by other users. Note that preference information of the user, for example, can be defined based on user's profile and activity history such as past activity pattern and rating information. Further, preference information of the user can be arbitrarily defined.

Figure 3:
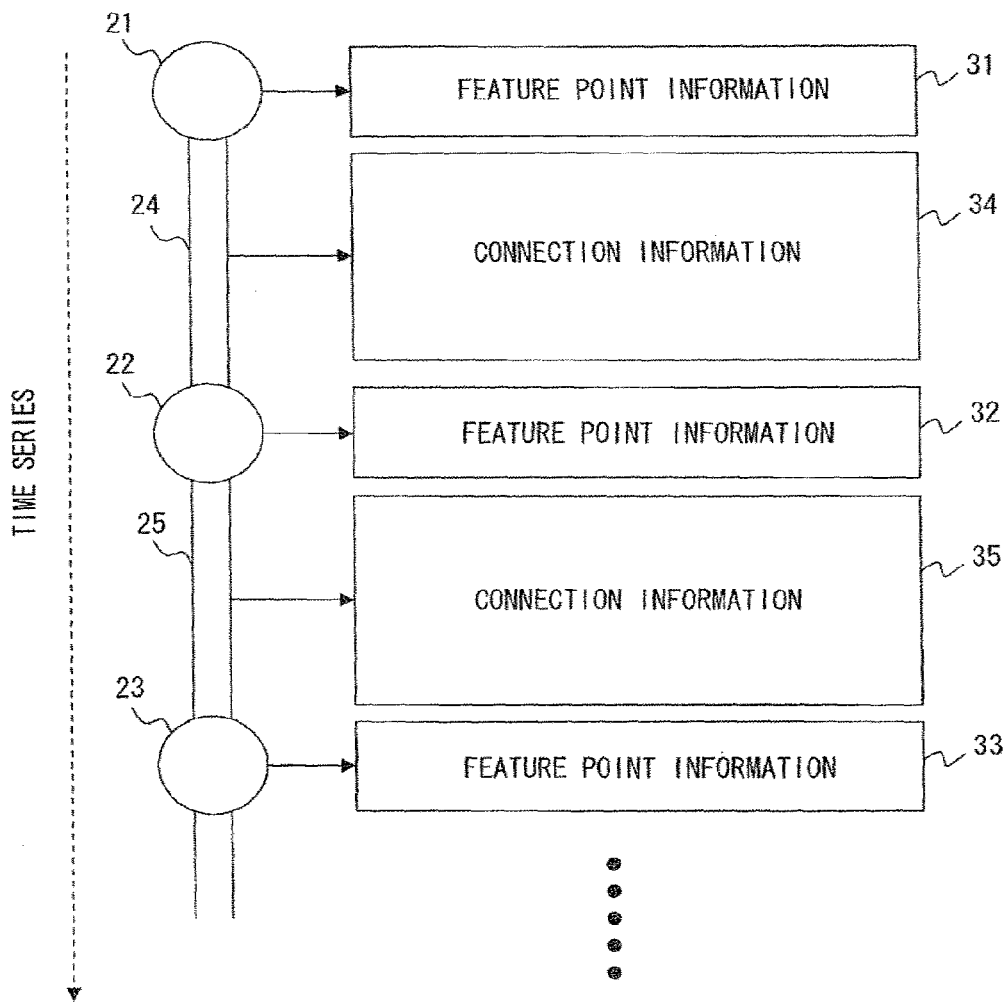
FIG. 3 shows an example of a template that is output by using an information organizing system according to an exemplary embodiment.

Next, a template that expresses summary information of the log data is created according to a predetermined process based on the ranked feature point group by using the template creation means 13 (step S6). Typically, the template is described by html or the like. However, it is not limited to html or the like. In the case of GPS data that is obtained when the user travels, it becomes, for example, one shown in FIG. 3. In FIG. 3, as a template, based on GPS data obtained through the travel, a predetermined number of feature points 21, and 23 having high relevance with its path are extracted and displayed in a time series manner. Further, for each of the feature point 21, 22 and 23, corresponding one of the feature point information pieces 31, 32 and 33 is displayed. Further, as connection information pieces 34 and 35 corresponding to paths 24 and 25 between the feature points 21, 22 and 23, it is possible to display transfer information that can be surmised from, for example, a time spent for the transfer and/or previous and subsequent feature points and necessary traveling time, such as transportation means. Note that the output example shown in FIG. 3 is a mere example, and the template that expresses summary information of the log data can be arbitrarily determined.

Further, feature points other than those used for the display and related information can be reconstructed no that the user can edit them with ease. The displayed template is just a template, and the user can increase the number of feature points to be displayed or delete some of them based on this template information. For this, when the number of feature points is increased, for example, it is possible to, in response to a right-click on connection information, display information having high relevance with the connection information in a pull-down menu or the like. Note that the information having high relevance with connection information is, for example, information that belongs to the connection information hut was not selected based on the result of the ranking process in the step S5. In this case, the data is regrouped, associated, and ranked for each feature point and/or connection information (hereinafter, a feature point and connection information is also called "display object") so that information having high relevance with connection information can be displayed according to the priority order.

Further, it is possible to further edit the data and post additional information with ease by associating a feature point selected as a display object with highly-related data (such as photograph data and text data describing the feature) in advance. Note that in addition to the highly-related feature point information detected by the relevance detection means 8, detailed information such as comments and photographs that are associated with feature points registered in the reference information database 1 in advance, for example, can be also included in this data to be associated. Further, for example, photograph data obtained by user's digital camera and comment information can be also registered in the index table according to the relevance by using a similar technique to the above-described technique based on their creation time/place, and can be reconstructed by using a similar technique.

Figure 4:
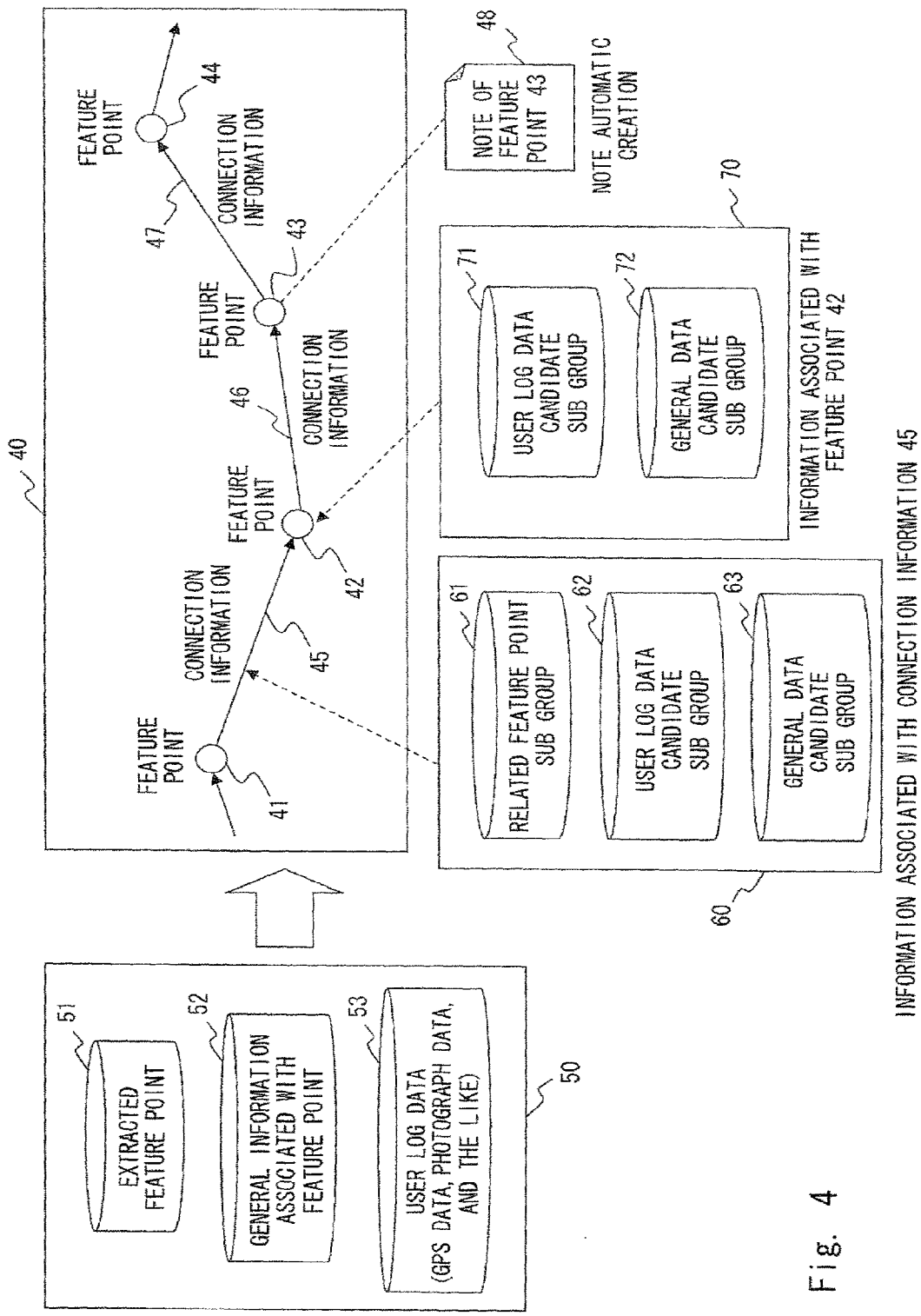
FIG. 4 shows an example of a case where a template that is output by using an information organizing system according to an exemplary embodiment is reconstructed so that it can be edited.

An example of reconstruction is explained hereinafter with reference to FIG. 4. As shown in FIG. 4, for feature points 41, 42, 43 and 44 and connection information pieces 45, 46 and 47 constituting a template 40 to be displayed, it is possible to associate various supplemental information having high relevance with feature point information and connection information other than these display objects with respective display objects by using a technique shown below.

The template information 40 composed of the feature points 41, 42, 43 and 44 and the connection information pieces 45, 46 and 47 between the feature points shown in FIG. 4 is automatically generated based on an information group 50 such as extracted feature point information 51, general information 52 associated with the feature points, and log data 53. In this example, the information group 50 is decomposed and reconstructed according to the relevance with the feature points 41, 42, 43 and 44 and the connection information pieces 43, 46 and 47.

Further, for example, connection information 45 is reconstructed and associated with information 60 including a related feature point sub group 61, a log data candidate sub group 62, and a general data candidate sub group 63. Further, a feature point 42 is reconstructed and associated with information 70 including a log data candidate sub group 71 and a general data candidate sub group 72. Further, it is possible to automatically display detailed information of a display object as the detailed information of the display object according to a predetermined rule by using pre-prepared detailed information. For example, a note 48 such as text information describing a feature point 43 in detail or photograph information can be automatically created from general information relating to the extracted feature point and associated with the feature point 43. Then, the node 48 can be automatically displayed by using a rule specifying that it is automatically displayed according to its importance or the like.

Next, the created template information is transferred to the client side through a network (step S7). The user displays and checks the template information transferred from the server by using a user terminal (step S8). Further, the user can edit template information by using the displayed template information and the log data that has been reconstructed by the above-described technique (steps S9 and S10). Then, the editing of the template information by the user is completed and the template creation task is finished (step S11).

By using the information organizing system and the information organizing method according to this exemplary embodiment explained above, it is possible to omit unnecessary details from enormous log data and thereby to swiftly display information that is obtained by preferentially summarizing part of the log data that is important to the user. This is because, by using a database in which an information group that could become characteristic information with a high probability is collected and information about user's profile, important information can be swiftly extracted from the log data.

Further, by using the information organizing system and the information organizing method according to this exemplary embodiment, it is possible to associate related information that is not directly included in the user's log data but has high relevance with the user's log data, is important to the user, or attracts user's interest with a high probability with the summary display of the log data and thereby to display the related information together with the summary display of the log data.

Next, a specific example in which template information is created by using the information organizing system and the information organizing method according to the above-described exemplary embodiment is explained. As a specific example, a system capable of automatically outputting a book-of-travel template by uploading GPS data that a user has collected when the user has traveled is explained.

Figure 5:
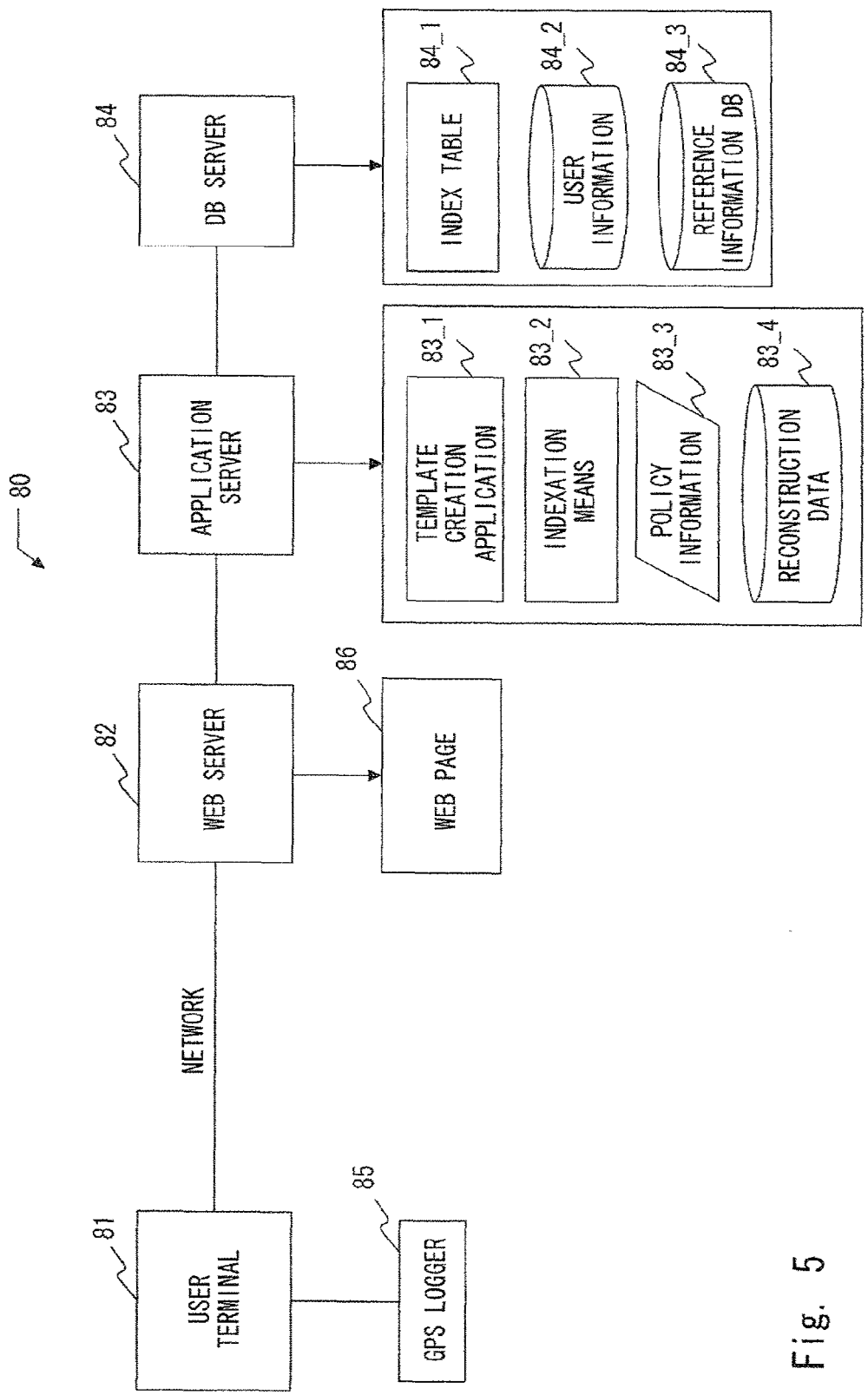
FIG. 5 is a block diagram showing an example of an information organizing system according to an exemplary embodiment.

FIG. 5 is a block diagram showing a specific example of an information organizing system 80 according to this exemplary embodiment. As shown in FIG. 5, the information organizing system 80 includes a user terminal 81, a web server 82, an application server 83 and a database server 84. A user has a GPS logger 85 as a user device. The user terminal 81 is connected to the web server 82 through a network, and they can exchange data with each other. The user accesses the web server 82 from the user terminal 81, logs in by using an account unique to the user through a web page 86, for example, and uploads log data that has been created/collected during a travel to the web server 82.

The application server 83 includes a template creation application 83_1, indexation means 83_2, policy information 83_3, and reconstruction data 83_4. Further, the database server 84 includes an index table 84_1, user information 84_2, and a reference information database 84_3.

In the reference information database 84_3 of the database server 84, data relating to feature points shown in FIG. 6, for example, is registered. Each feature point is extended to a generalized expression, and closeness in spatial distance is extracted as a high y-related feature point by using the LSH. Further, they are stored in the index table 84_1. The database server 84 carries out these processes in advance through an off-line process. Note that in the reference information database 84_3, feature points, geodetic coordinates, category information, and rating information are registered.

This generalized vector space is expressed as the direct sum of the three-dimensional physical geodetic coordinate space and the vector space expressing the category information. In general, for a positive integer K, the category information space can be expressed as a K-dimensional space. However, in this exemplary embodiment, for the sake of simplicity, it is assumed that there are two categories "mountain" and "theme park", and they are expressed in two points in one dimension ("1" is "mountain and "−1" is "theme park").

Further, when the geodetic coordinate space is also simplified and expressed in two dimensions by ignoring the height direction, an expression in the generalized vector space is expressed as a point in "two-dimensional physical geodetic coordinate space"+"one-dimensional category information"="three-dimensional vector space". For example, "feature point A" is a1, a2, 1); "feature point B" is (b1, b2, −1); "feature point C" is (c1, c2, 1); and "feature point D" is (d1, d2, 1). They are located in points 91, 92, 93 and 94 respectively in a three-dimensional vector space shown in FIG. 7. However, it is assumed that a1, a2, c1, c2, d1 and d2 are component values in a two-dimensional space obtained by ignoring the height direction of the geodetic coordinates of the feature points A, 8, C and D. These feature points are registered in the index table 84_1 stored in the database server 84. Alternatively, this index table 84_1 may be stored in the application server 83.

Further, for these feature points, it is possible to specify rating information by other users by using a real number in the range of [0, 1] in advance. It is assumed that the larger the rating information is, the higher the evaluation is (the higher the popularity is). In this example, it is assumed that the feature point A is 0.8; the feature point B is 0.7; the feature point C is 0.5; and the feature point D is 0.9.

It is assumed that GPS log data input by a user is discrete data i.e., geodetic coordinates that are distributed between a point X(x1, x2) to a point Y(y1, y2) at appropriate time intervals. This GPS log data forms a straight path from the point X(x1, x2) to the point Y(y1, y2). Further, it is assumed that based on the past history of the user, it is defined that the user has a strong interest in mountains and small interest in theme parks as information about user's interest. It is assumed that this information is expressed by vector components in the generalized vector. This can be determined based on, for example, the category information of photograph data (the number of photographs of mountains is high or the like) uploaded by the user in the past.

Figure 7:
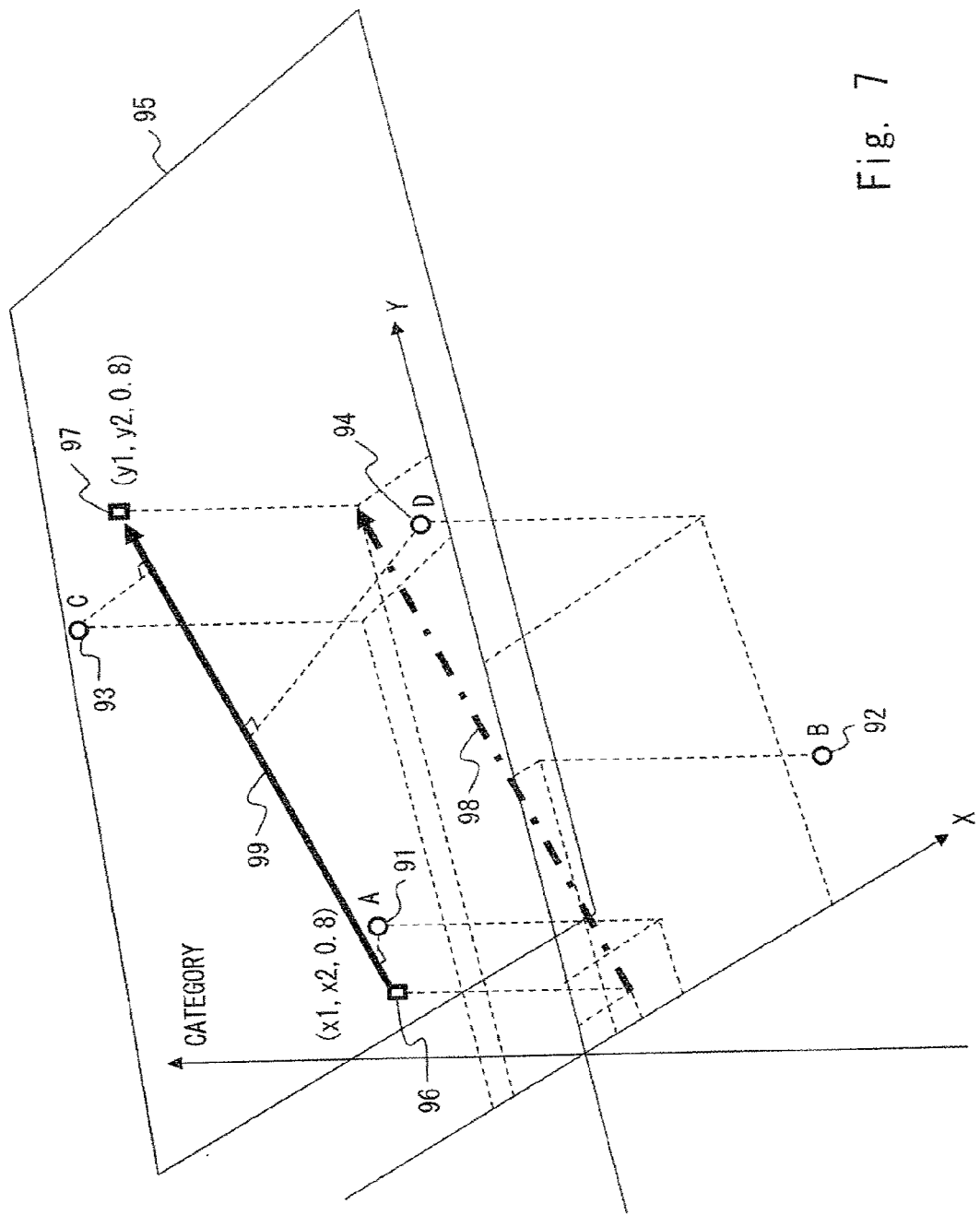
FIG. 7 shows a three-dimensional vector space that is used when a template is created by using an information organizing system according to an exemplary embodiment.

In this exemplary embodiment, for the sake of simplicity, it is expressed as a point in one-dimensional vector space, i.e., the category information space. (It is expressed by an internally dividing point in the range of "−1" to "1". For example, when the number or mountain photographs is nine and the number of theme-part photograph is one, it is expressed as (9×1+1×(−1))/10=0.8.1 En this case, the component value about the interest category of this user is 0.8, and the expression of the path of the GPS log data in the generalized vector space is extended to a path in "two-dimensional physical geodetic coordinate space"+"one-dimensional category information"="three-dimensional vector space" as shown in FIG. 7 and thus becomes a path 99 on a surface 99.

The expression of the GPS log data of this user (hereinafter, called "generalized path") is a group of points on a straight line extending from (x1, x2, 0.8) to (y1, y2, 0.8). The geometric positions of the start point and the end point of this generalized path are expressed by points 96 and 97 respectively in FIG. 7, and the generalized path is expressed by a path 99 for the path 98 of its geodetic coordinates. That is, the extended log data obtained by expressing the path 98, which is the log data, in an extended manner by using generalized expression means becomes the path 99.

When the user uploads GPS log data, the web server 82 issues a template file creation request to the application server 83. In the application server 83, the application 83_1 that creates a template from user's log data is installed. When the application server 83 obtains the log data uploaded from the web server 82, the application server 83 creates extended log data by processing the data together with information about user's interest as described above and thereby converting the processed data into a generalized expression.

Further, the application server 83 supplies the created extended log data to the LSH, examines an entry ID output from the LSH, and extracts a feature point group including a predetermined number of highly-related feature points from the index table 84_1 located in the database server 34 by using that entry ID as a key. In this process, if the number of extracted data pieces does not reach the predetermined number, data pieces are further obtained from neighboring table entries in the ascending order of their distance. Then, when the number of data pieces reaches the predetermined number, the data obtaining process is stopped.

In this exemplary embodiment, it is assumed that the number of feature points to be extracted is two. In this case, as shown in FIG. 7, since the feature point A and the feature point C are closely located to the user's path in the generalized expression, they are extracted. In contrast to this, since the feature point B is distant along the category information axis, it is not detected as being located near the generalized path. This result reflects the fact that this user has a stronger interest in mountains than in theme parks. Further, since the feature point D is distant from the user's path in terms of physical distance, it is determined to be irrelevant to this log data and thus is not extracted.

When the group of highly-related feature points (feature points A and C) is obtained, the feature points are ranked based on the user information 84_2 stored in the database server 84 and the policy information 83_3 stored in the application server 83 and an object(s) to be displayed is thereby determined. The policy information can be determined in various manners. However, for the sake of simplicity, rating information by other users is used in this exemplary embodiment. Therefore, the feature points are sorted in such a manner that the feature point A having higher rating information is ranked in a higher position than the feature point C. As a result, the feature point A is used more preferentially than the feature point C.

By using this result, a template written in a format that can be displayed in a web browser such as html is created. For the sake of simplicity, it is configured in such a manner that only one feature point is displayed in this exemplary embodiment. Therefore, the feature point A is selected. Note that, as described above, the data such as highly-related feature point information and detailed information associated to that feature point information is reconstructed for each of the display objects (start point X, end point Y, feature point A, connection information of X-A, and connection information of A-Y), and this reconstructed data 83_4 is stored in the application server 83.

Figure 8:
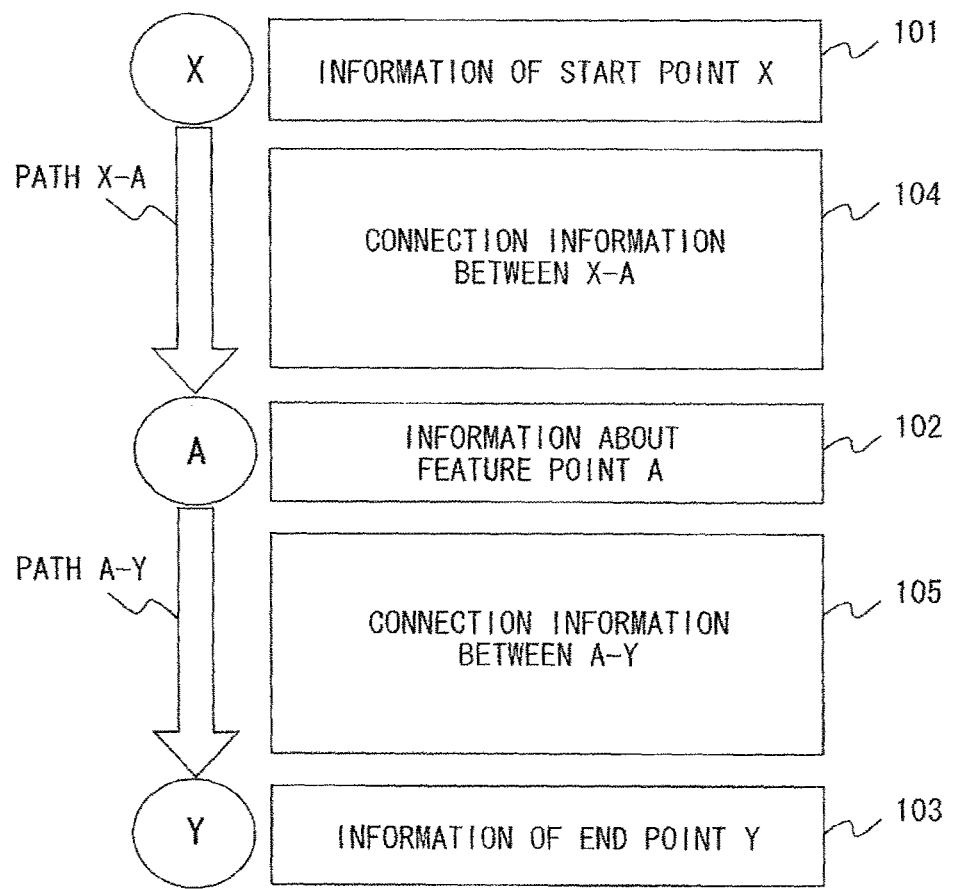
FIG. 8 shows an example of a template that is output by using an information organizing system according to an exemplary embodiment.

As a result of this process, a template (book of travel) shown in FIG. 8 is created. The template (book of travel) shown in FIG. 8 has the start point X and the end point Y. Further, information 101 of the start point X and information 103 of the start point Y are displayed at the start point X and the end point Y respectively. Further, the extracted feature point A is a feature point that is presumed to have the highest relevance with the user in the travel from the start point X to the end point Y. Therefore, information 102 about the feature point A is automatically displayed.

Further, connection information 104 of the path X-A and connection information 105 of the path A-Y are also automatically created, and information such as elapsed time, for example, can be displayed. Note that information of the feature point C, which is another detected feature point, is reconstructed so that it is associated with connection information object between the feature point A and the end point Y. In this way, when the user selects connection information A-Y and further edits the template to add new information, for example, that information can be preferentially display.

Note that the data defined in this exemplary embodiment is just a simplified example. For example, in the generalized expression, it is possible to add other measurement data such time information in addition to the GPS information. Further, it is also possible to increase the dimension and thereby display more complicated information by incorporating information composed of other non-measurement data including category information. Further, the generalized path does not necessarily have to be a path on a fixed plane. That is, it is possible to add an extension such as expressing it a curved surface that depends on the place, and expressing it by a plurality of generalized paths for which weights are stochastically defined.

According to the information organizing system and the information organizing method in accordance with the present invention explained above, by uploading log data to the server, it is possible to automatically create a hook of travel, a book of activity, or the like while maintaining the response ability with an excellent real-time ability. Further, the information organizing system and the information organizing method according to the present invention is also applicable to other purposes including recommending related information such as highly-related shops and tourist spots from the activity pattern of a user based on log data, and displaying advertisements containing highly-relevant information.

Figure 9:
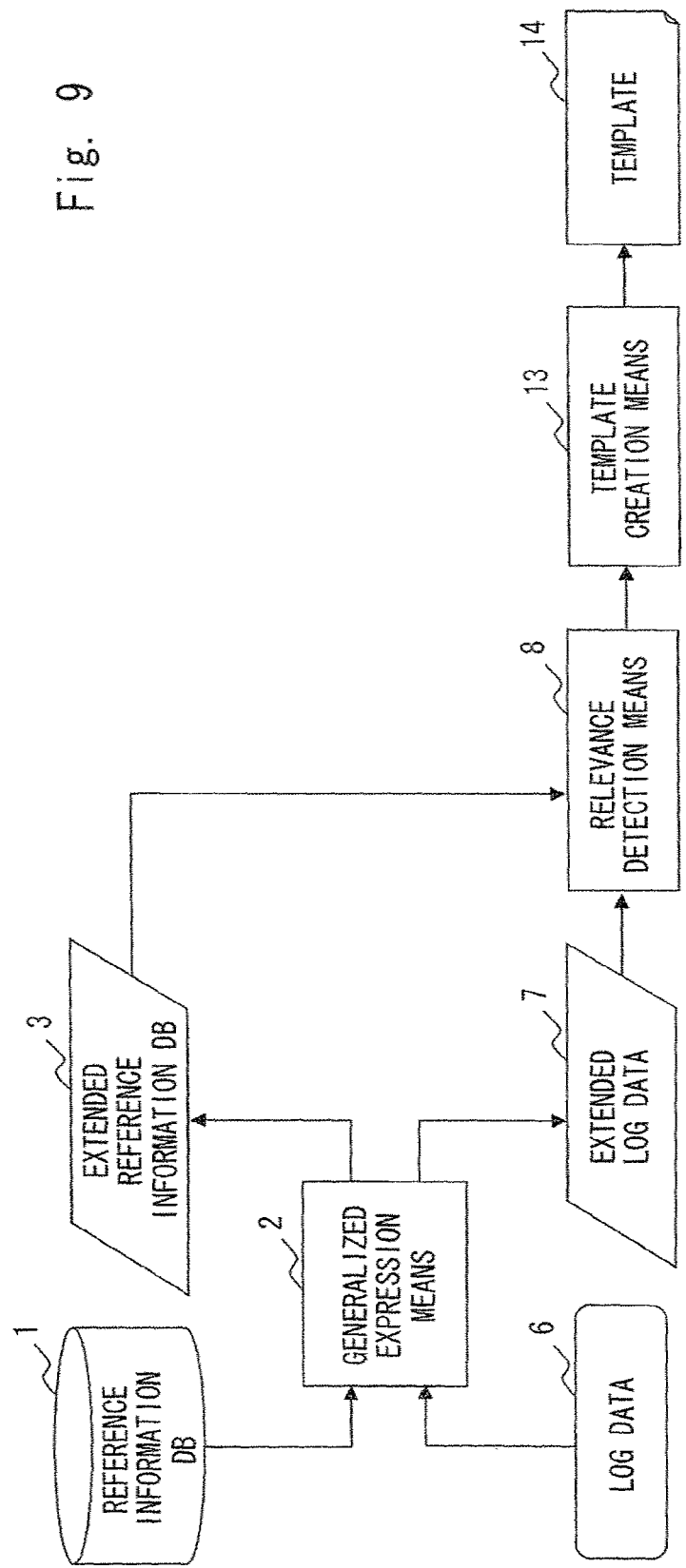
FIG. 9 is a block diagram showing an information organizing system according to an exemplary embodiment.

Note that the information organizing system according to this exemplary embodiment may include at least components shown in FIG. 9. That is, the information organizing system according to this exemplary embodiment includes: a reference information database 1 storing reference information; generalized expression means 2 to map measurement data and non-measurement data in a space in such a manner that the more they resemble each other, the shorter a distance between them becomes; an extended reference database 3 storing extended reference information that is generated by expressing the reference information in an extended manner by using the generalized expression means; extended log data 7 that is generated by expressing log data 6 in an extended manner by using the generalized expression means 2; relevance detection means 8 to measure a strength of relevance between the extended reference information and the extended log data based on a distance in the mapped space, and detect extended reference information having high relevance with the extended log data; and template creation means 13 to create a predetermined template 14 in which the log data is summarized by using the extended reference information detected by the relevance detection means 8. As a result, the above-described advantageous effects can be achieved. Note that each component shown in FIG. 9 is already explained above with reference to FIG. 1, and therefore its explanation is omitted.

Further, a program that causes a computer to execute a process of creating a predetermined template from registered log data according to this exemplary embodiment causes the computer to execute the following steps: a step of generating extended reference information by expressing reference information in an extended manner by using generalized expression means to map measurement data and non-measurement data in a space in such a manner that the more they resemble each other, the shorter a distance between them becomes; a step of generating extended log data by expressing the registered log data in an extended manner by using the generalized expression means; a step of measuring a strength of relevance between the extended reference information and the extended log data based on a distance in the mapped space, and detecting extended reference information having high relevance with the extended log data; and a step of creating a predetermined template in which the log data is summarized by using the detected extended reference information.

The above-described program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Although the present invention has been explained with reference to exemplary embodiments in the above explanation, the present invention is not limited to the above-described exemplary embodiments. Various modifications that can be understood by those skilled in the art can be made to the configuration and the details of the present invention without departing from the scope of the present invention.

This application is based upon and claims the benefit of priority from Japanese patent application No. 2010-031533, filed on Feb. 16, 2010, the disclosure of which is incorporated herein in its entirety by reference.

REFERENCE SIGNS LIST

1 REFERENCE INFORMATION DATA BASE
2 GENERALIZED EXPRESSION MEANS
3 EXTENDED REFERENCE INFORMATION DATABASE
4 STOCHASTIC INDEXATION MEANS
5 INDEX TABLE
6 LOG DATA
7 EXTENDED LOG DATA
8 RELEVANCE DETECTION MEANS
9 RELATED FEATURE POINT GROUP
10 RANKING MEANS
11 SCORING POLICY
12 FEATURE-POINT LIST
13 TEMPLATE CREATION MEANS
14 TEMPLATE
21, 22, 23 FEATURE POINT
24, 25 PATH
31, 32, 33 FEATURE POINT INFORMATION
34, 35 CONNECTION INFORMATION
40 TEMPLATE INFORMATION
41, 42, 43, 44 FEATURE POINT
45, 46, 47 CONNECTION INFORMATION
48 NOTE OF FEATURE POINT
50 INFORMATION GROUP
51 EXTRACTED FEATURE POINT INFORMATION
52 GENERAL INFORMATION ASSOCIATED WITH FEATURE POINT
53 LOG DATA
60 INFORMATION ASSOCIATED WITH CONNECTION INFORMATION
61 RELATED FEATURE POINT SUB GROUP
62 LOG DATA CANDIDATE SUB GROUP
63 GENERAL DATA CANDIDATE SUB GROUP
70 INFORMATION ASSOCIATED WITH FEATURE POINT
71 LOG DATA CANDIDATE SUB GROUP
72 GENERAL DATA CANDIDATE SUB GROUP
80 INFORMATION ORGANIZING SYSTEM
81 USER TERMINAL
82 WEB SERVER
83 APPLICATION SERVER
83_1 TEMPLATE CREATION APPLICATION
83_2 INDEXATION MEANS
83_3 POLICY INFORMATION
83_4 RECONSTRUCTION DATA
84 DATABASE SERVER
84_1 INDEX TABLE
84_3 REFERENCE INFORMATION DATABASE
84_2 USER INFORMATION
85 GPS LOGGER
86 WEB PAGE

The invention claimed is:

1. An information organizing system, comprising:
a reference information database that stores reference information including measurement data and non-measurement data;
a generalized expression unit that in a processing unit of a computer generates extended reference information and extended log data, the extended reference information generated by mapping the measurement data and the non-measurement data in a vector space in such a manner that the more the measurement data and the non-measurement data resemble each other, the shorter a distance between the measurement data and the non-measurement data becomes in the vector space, and the extended log data generated by extending a dimension of log data obtained from a user based on category information in which the user has a strong interest so that the dimension of the extended log data becomes equal to a dimension of the extended reference information;

an extended reference information database that stores the extended reference information generated by the generalized expression unit;

a relevance detection unit that measures a strength of relevance between the extended reference information and the extended log data based on a distance between the extended reference information and the extended log data in the mapped vector space, and detects extended reference information having high relevance with the extended log data;

a ranking unit that ranks the extended reference information detected by the relevance detection unit according to a scoring policy defined for each user; and a template creation unit that creates a predetermined template in which the log data is summarized by using the extended reference information ranked by the ranking unit.

2. The information organizing system according to claim 1, further comprising a stochastic indexation unit to register the extended reference information in such a manner that the nearer the extended reference information pieces are located each other, with the higher probability they are registered in a same index table.

3. The information organizing system according to claim 2, wherein the relevance detection unit detects the extended reference information registered in the index table by using an entry ID obtained based on the extended log data.

4. The information organizing system according to claim 2, wherein at least one of the extended reference information and the extended log data is reconstructed while associating said at least one of the extended reference information and the extended log data with a template created by the template creation unit.

5. The information organizing system according to claim 3, wherein at least one of the extended reference information and the extended log data is reconstructed while associating said at least one of the extended reference information and the extended log data with a template created by the template creation unit.

6. The information organizing system according to claim 1, wherein at least one of the extended reference information and the extended log data is reconstructed while associating said at least one of the extended reference information and the extended log data with a template created by the template creation unit.

7. The information organizing system according to claim 1, wherein the reference information database includes a feature point and feature point information relating to the feature point, and the feature point information includes measurement information and non-measurement information.

8. The information organizing system according to claim 1, wherein the log data comprises a group of data pieces including data created by a user, data measured by the user, and data to which information about a place or a time relating to these data pieces is added.

9. The information organizing system according to claim 1, wherein the relevance detection unit detects the extended reference information having said high relevance with the extended log data such that the extended reference information with a highest relevancy is extracted with a highest probability.

10. The information organizing system according to claim 1, wherein the measurement data comprises geodetic coordinates and the non-measurement data comprises category information.

11. The information organizing system according to claim 1, wherein the space comprises a multi-dimensional vector space such that the generalized expression unit expressed a generalized vector space by a direct sum of a vector space that expresses the measurement information and another vector space that expresses the non-measurement information.

12. The information organizing system according to claim 11, wherein the relevance detection unit detects the extended reference information having said high relevance with the extended log data such that the extended reference information with a highest relevancy is closest to the generalized vector space.

13. The information organizing system according to claim 11, wherein the relevance detection unit detects the extended reference information such that said high relevance with the extended log data and the extended reference information have a shorter distance to the generalized vector space than a distance of a remaining of the reference information to the generalized vector space.

14. An information organizing method, comprising:
storing measurement data and non-measurement data as reference information in a reference information database;
registering log data obtained from a user;
generating extended reference information by extending the reference information to map the measurement data and the non-measurement data in a vector space in such a manner that the more the measurement data and the non-measurement data resemble each other, the shorter a distance between the measurement data and the non-measurement data becomes in the vector space;
generating extended log data by extending a dimension of the log data based on category information in which the user has a strong interest so that the dimension of the extended log data becomes equal to a dimension of the extended reference information;
measuring a strength of relevance between the extended reference information and the extended log data based on a distance between the extended reference information and the extended log data in the mapped vector space, and detecting extended reference information having high relevance with the extended log data;
ranking the extended reference information according to a scoring policy defined for each user; and
creating a predetermined template in which the log data is summarized by using the ranked extended reference information.

15. A non-transitory computer readable medium that causes a computer to execute:
storing measurement data and non-measurement data as reference information in a reference information database;
generating extended reference information by extending the reference information to map the measurement data and the non-measurement data in a vector space in such a manner that the more the measurement data and the non-measurement data resemble each other, the shorter a distance between the measurement data and the non-measurement data becomes in the vector space;
generating extended log data by extending a dimension of log data obtained from a user based on category information in which the user has a strong interest so that the dimension of the extended log data becomes equal to a dimension of the extended reference information;
measuring a strength of relevance between the extended reference information and the extended log data based on a distance between the extended reference information and the extended log data in the mapped vector space, and detecting extended reference information having high relevance with the extended log data;

ranking the extended reference information according to a scoring policy defined for each user; and creating a predetermined template in which the log data is summarized by using the ranked extended reference information.

\* \* \* \* \*